United States Patent [19]

Kelly

[11] Patent Number: 4,669,447
[45] Date of Patent: Jun. 2, 1987

[54] CONVECTION OVEN WITH HARD-WOOD SMOKE GENERATOR

[76] Inventor: James S. Kelly, 2917 S. Boston Ct., Tulsa, Okla. 74114

[21] Appl. No.: 910,814

[22] Filed: Sep. 23, 1986

Related U.S. Application Data

[63] Continuation-in-part of Ser. No. 837,020, Mar. 6, 1986, abandoned.

[51] Int. Cl.⁴ ............................................. A01G 13/06
[52] U.S. Cl. .................................. 126/59.5; 126/25 R; 126/21 A; 99/482; 99/481; 426/314
[58] Field of Search ................ 126/25 R, 59.5, 275 R, 126/275 E, 276; 99/467, 481, 482; 426/314

[56] References Cited

U.S. PATENT DOCUMENTS

| | | | |
|---|---|---|---|
| 3,130,662 | 4/1964 | Robinson | 99/481 X |
| 3,173,357 | 3/1965 | Nunnery | 99/482 |
| 3,788,301 | 1/1974 | Terry | 126/59.5 |
| 4,474,107 | 10/1984 | Cothran | 426/314 X |

Primary Examiner—Margaret A. Focarino
Attorney, Agent, or Firm—Head Johnson Stevenson

[57] ABSTRACT

An improved compact convection oven and smoke generator for smoking meat and the like wherein the smoke generator automatically advances a block of hard-wood against a heated, rotating metal surface with scraping blade. In this manner, the build-up of an insulating layer of char on the smoldering hard-wood is controlled, resulting in improved control of smoke production.

15 Claims, 6 Drawing Figures

CONVECTION OVEN WITH HARD-WOOD SMOKE GENERATOR

This is a continuation-in-part of co-pending application Ser. No. 837,020 filed on Mar. 6, 1986, now abandoned.

BACKGROUND OF THE INVENTION

1. Field of the Invention:

This invention relates to a convection oven with an automatic hard-wood smoke generator. More specifically, the invention relates to an improved smoke generator employing a heated block of hard-wood wherein the surface char on the hard-wood is periodically removed by scraping.

2. Brief Description of the Prior Art:

The basic concept of generating smoke from hardwood chips or sawdust during the cooking of meat, fish and the like is generally known and commercially practiced in the food industry. Generally, wood chips and/or sawdust with or without presoaking in water are heated or maintained at a temperature and condition just below the ignition or kindling temperature such that the wood smolders and generates smoke without igniting into a flame. The smoke generated in this manner is then circulated or comingled with the food such as to impart a barbecue smoke flavoring. In the past, either sawdust or small wood chips have been preferably employed since the use of larger blocks of wood result in difficulties in maintaining a continuous production of a uniform and large quantity of smoke. This in part can be attributed to the fact that the char and ash build-up at the surface of the smoldering hard-wood block protects and insulates the inner portion of the wood block, thus inhibiting the continued production of smoke. Agitation of the wood and various methods of controlling the rate of heat transferred to the wood have been historically proposed to overcome these problems, but with little success. To the best knowledge of the present Inventor, prior to the present invention, no one has successfully been able to maintain high volumes of continuous smoke generation for use in a compact convection oven while employing a block of hard-wood rather than sawdust or wood chips.

SUMMARY OF THE INVENTION

In view of the prior art, I have discovered an improved smoke generator and method of generating smoke that is particularly useful in combination with a compact convection oven. The improved method according to the present invention involves the recognition that periodic scraping of the char from the surface of the heated block of wood results in improved control and increased production of smoke. Thus, the present invention provides an improved convection oven/smoker comprising:

(a) an insulated oven compartment having at least one oven door thereto;

(b) an insulated smoke generator compartment adapted to supply smoke to the insulated oven compartment; and (c) a smoke generator within the insulated smoke generator compartment comprising, (i) a channel means operatively adapted to accept and hold a block of wood to be heated for generation of smoke and further adapted to move at least one face of the block of wood towards a heated surface during production of smoke, and (ii) a heated surface containing a scraping means that is operatively adapted to make contact with at least one face of a block of wood held in the channel means and further adapted to periodically scrape exececss char off the face of the block of wood making contact and being heated by the heated surface during production of smoke, thus controlling the deleterious build-up of insulating char on the face of the block of wood during the production of smoke and resulting in improved control of smoke production.

In one particularly preferred embodiment of the present invention, the heated surface containing the scraping blade is a revolving cylinder with scraping blade. Preferably, the cylinder and scraping blade are revolved at an adjustable variable rate from about one revolution per ten minutes up to six or more revolutions per minute with the hard-wood being forced against the heated cylinder at a force of about two pounds per square inch. In another particularly preferred embodiment of the present invention, the heated surface containing the scraping means is again a revolving cylinder with scraping blade which revolves about a variable wattage heating element. In this preferred embodiment, the cylinder and scraping blade are revolved at a fixed rate again from about 1 revolution per ten minutes up to 6 or more revolutions per minute, as in the previously preferred embodiment, but the electrical power to the central heating element is varied, thus varying the wattage output and resulting temperature of the heated surface making contact with the hard-wood.

It is object of the present invention to provide a compact convection oven/smoker that is highly efficient in that it smokes meat and the like at a faster rate. It is a further object of the present invention to provide an improved smoke generator and method of producing smoke that alleviates the problems associated with excess char build-up on smoldering solid wood as well as overcoming the vicissitudes inherent in the production of smoke when using sawdust or wood chips. And it is a further object of the present invention to provide a smoke generator that uses blocks of hard-wood rather than sawdust or wood chips. Fulfillment of these objects and the presence and fulfillment of additional objects will be apparent upon complete reading of the specification and claims taken in conjunction with the drawings.

DESCRIPTION OF THE PREFERRED EMBODIMENTS

Figure 1:
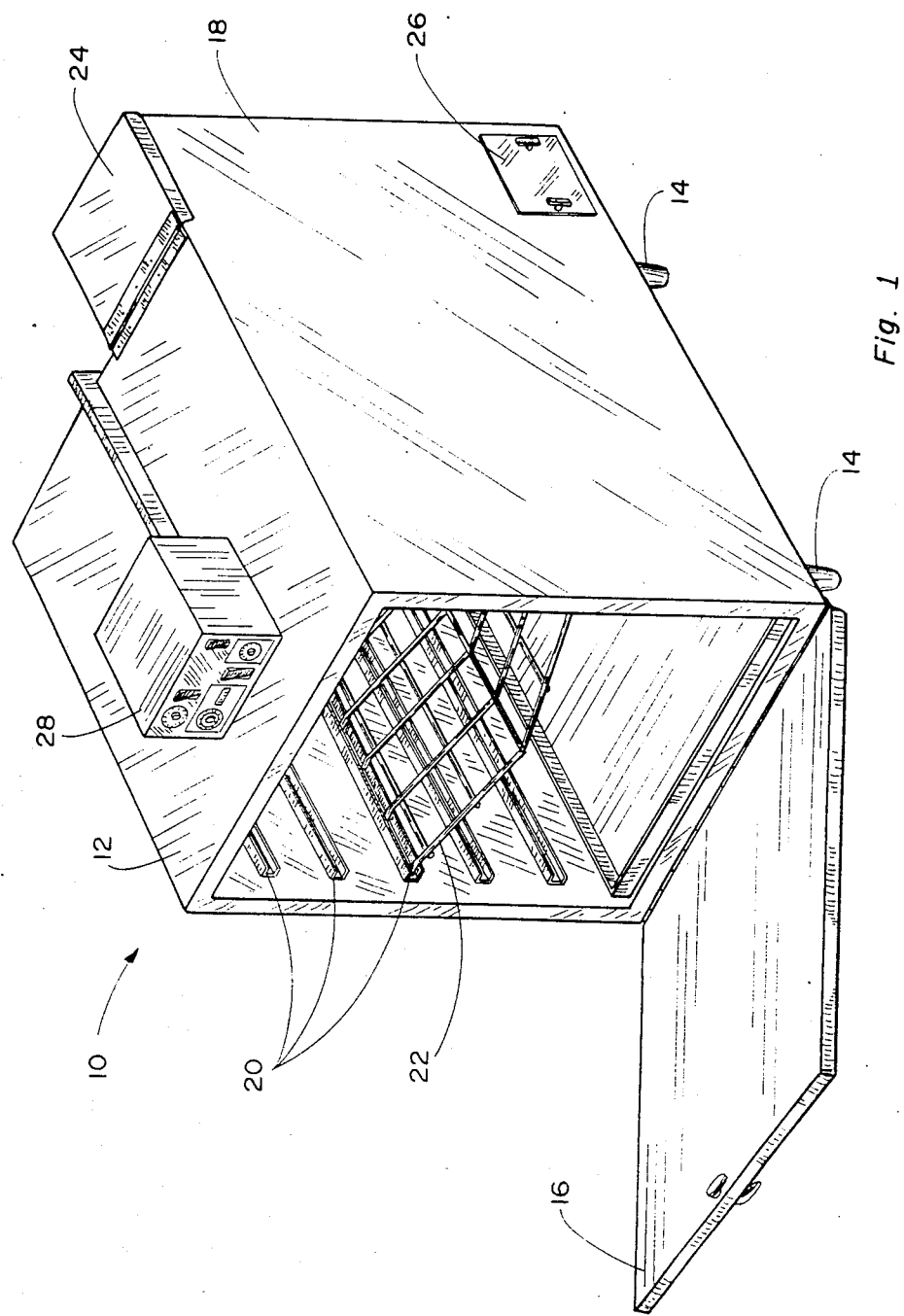
FIG. 1 is a perspective view of a convection oven with smoke generator according to the present invention with the door of the oven partially open.

The convection oven with improved hard-wood smoke generator according to the present invention, how it operates, and how it differs from previous devices can perhaps be best described and understood by reference to the drawings. As illustrated in FIGS. 1 through 5, the convection oven generally designated by the numeral 10 comprises an oven chamber 12 supported on legs 14 with frontal access door 16 and separate but attached smoke generating chamber or compartment 18. As further illustrated in FIG. 1, the interior of the oven chamber 12 involves a plurality of sidewall ledges 20 to support wire grids 22 for placing meat and the like thereon during use. The attached smoke generating chamber 18 is equipped with hinged lid 24 for introducing blocks of hard-wood and a lower door 26 for removal of ash. On the top of the oven chamber 12 is a master control panel 28 for operating the smoker/oven as explained later.

Figure 2:
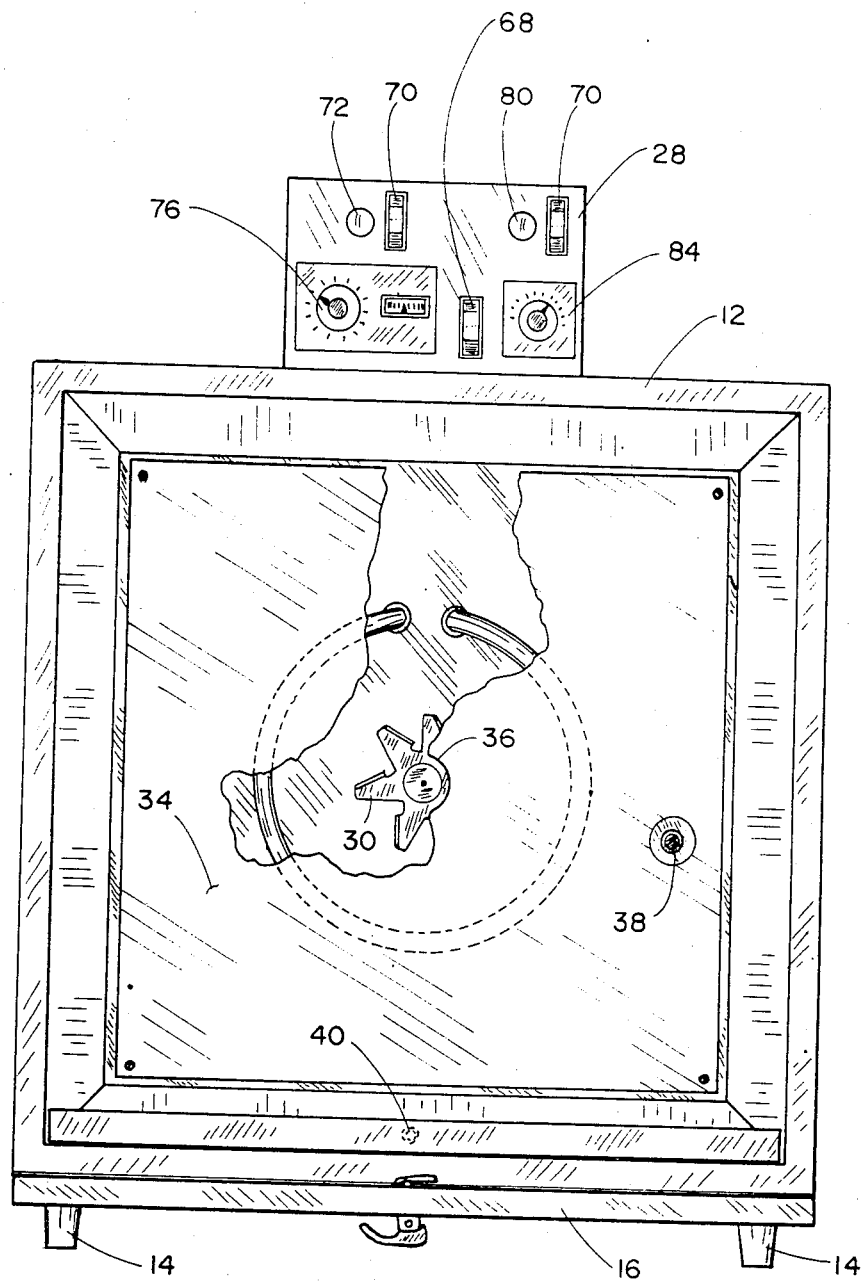
FIG. 2 is a frontal view of the convection oven with smoke generator of FIG. 1 with the lid of the oven door open and the interior of the oven partially cut away.

As illustrated in FIG. 2, at the inner far rear wall of the oven chamber 12 is a centrally located circulating fan 30 surrounded by a heating element 32. Directly in front of the circulating fan 30 and heating element 32 is a baffle plate 34 containing a central opening 36 through which the air within the oven chamber 12 is drawn by the circulating fan 30 during use of the convection oven 10 through the central opening 36 and then directed radially outward in all directions across heating element 32 around the plate 34. In this manner, the air and smoke within the oven chamber 12 is continuously circulating.

As further illustrated in FIGS. 2 and 4, this air circulation within the oven chamber 12 is also directed across the mouth or more specifically, the backside of the reverse sloped opening of tube 38 such as to extract smoke from the smoke generator chamber 18 into the oven chamber 12, as described more fully later. The bottom of the oven chamber 12 is also equipped with a small vent tube 40 (see FIGS. 3 and 4) which effectively vents the inner portion of the convection oven 10 to the atmosphere allowing the oven to operate at ambient pressure without pressure buildup.

Figure 3:
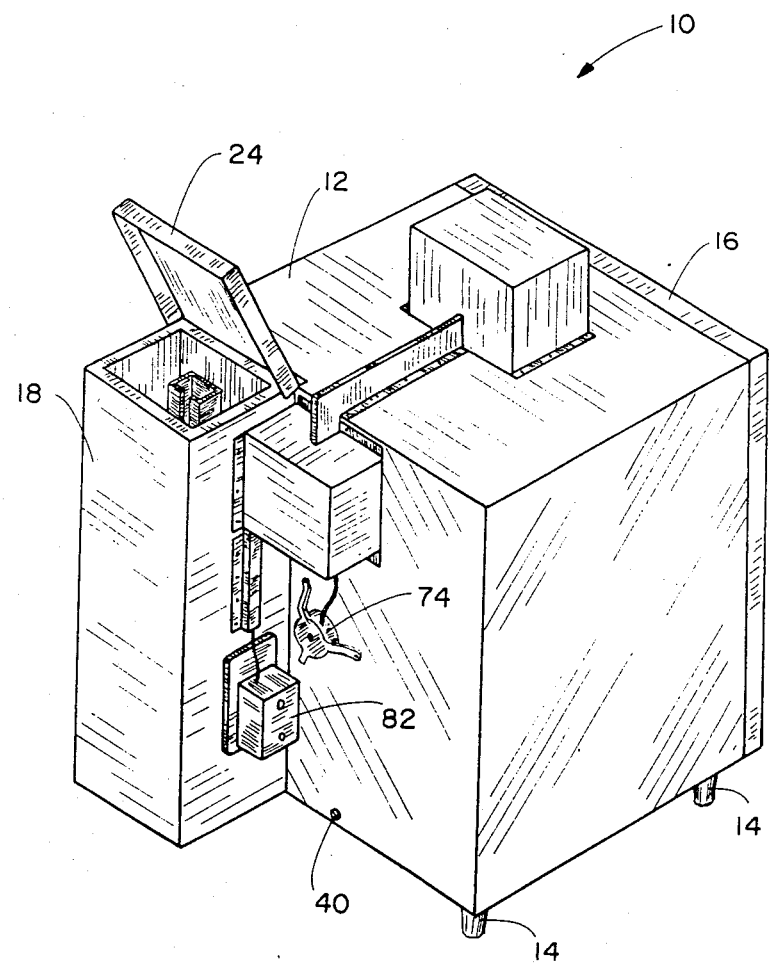
FIG. 3 is a rear perspective view of the convection oven with smoke generator of FIG. 1 with the smoke generator lid partially open.
Figure 4:
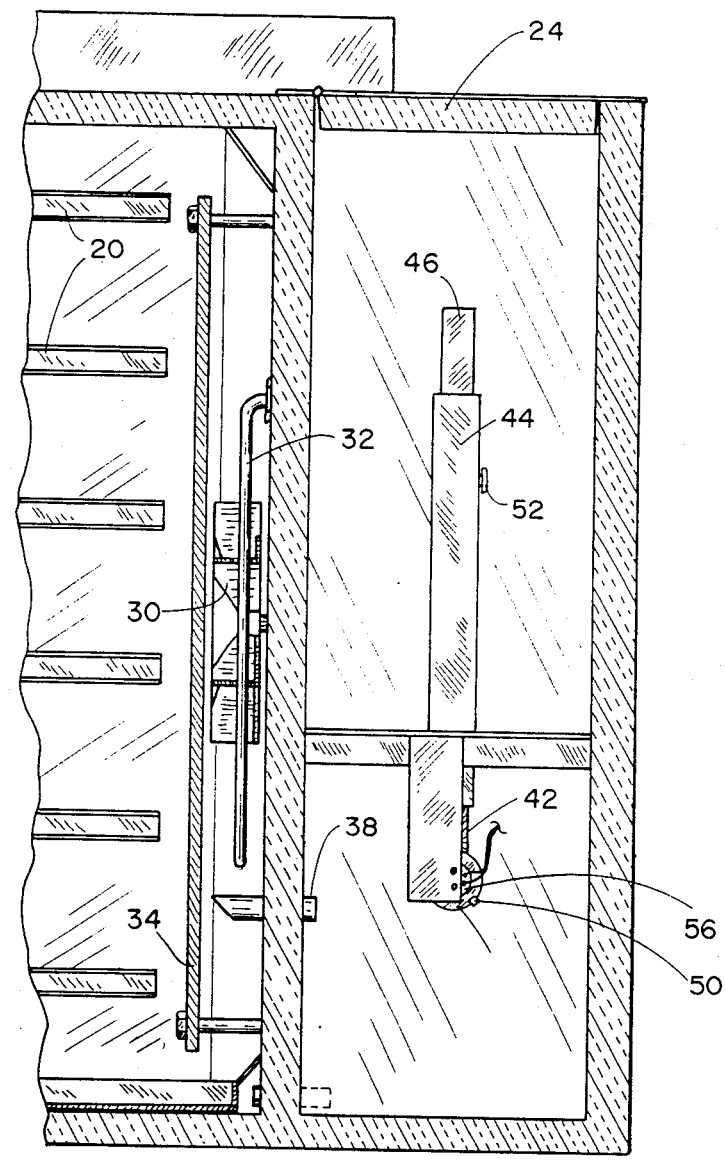
FIG. 4 is a partial cut-away side view of the smoke generator and rear portion of the convection oven of FIG. 1 as seen through line A—A.
Figure 5:
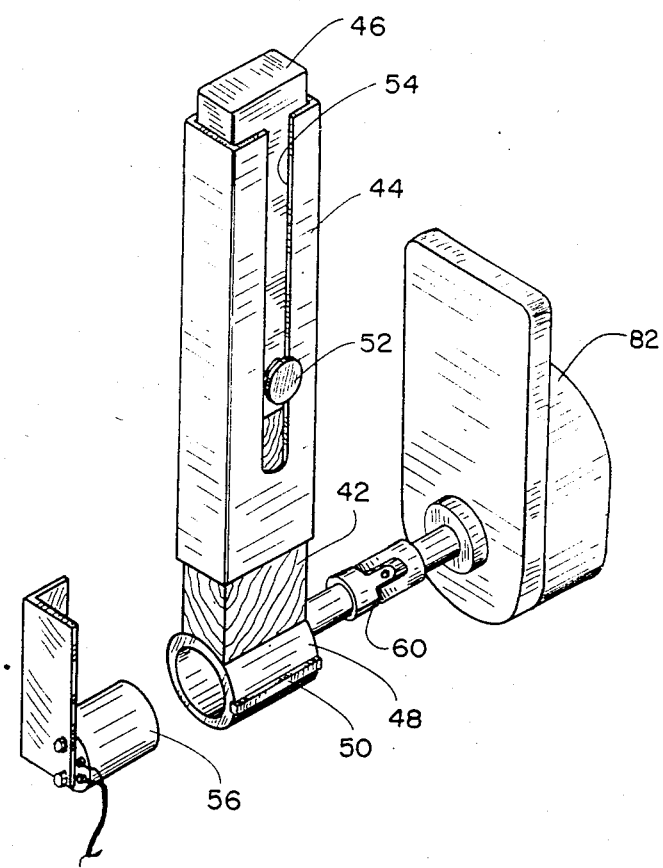
FIG. 5 is an exploded view of the internal structure of the smoke generator illustrated in FIG. 4.

As further illustrated in FIGS. 3, 4 and 5, the smoke generating chamber 18 is effectively a separate insulated compartment having a top door 24 for inserting fresh blocks of hard-wood 42 and a lower side door 26 (see FIG. 1) for removal of ash and char. Within the smoke generator chamber 18 is an essentially vertical rectangular tube or channel 44 which receives and holds individual blocks of hard-wood 42. The channel 44 also is adapted to receive a weight 46 placed on top of the block of hard-wood 42 such as to continuously apply a downward force on the hard-wood 42 during use. In this manner, the block of hard-wood 42 is guided and urged downwardly thus forcing the wood to make contact with the rotating, heated cylinder 48 and scraping blade 50 located at the base of the channel 44. In order to prevent the weight 46 from bottoming out and making metal to metal contact with the scraping blade 50 when the wood has been used up, a stop pin 52 is attached to the weight 46 such that the pin 52 will slide downwardly in vertical slot 54 found in channel 44. Vertical slot 54 bottoms out (stops) just before the lower end of channel 44, thus preventing the weight 46 from touching the cylinder 48 and blade 50.

Within rotating cylinder 48 is a concentrically positioned, stationary metal cylinder with electrical heating element 56 which serves as the heat source as well as a bearing surface for the rotating cylinder 48 and attached blade 50. In this manner and as illustrated in FIG. 5, the block of hard-wood 42 rests on the heated, rotating cylinder 48 and thus tends to smolder and char producing smoke, yet the blade 50 periodically wipes across the charred end of the hard-wood block scraping off excess loose char by virtue of gear motor 82 turning cylinder 48 through the connecting flexible shaft 60. By controlling the rate of revolution of cylinder 48 and blade 50 or by controlling the energy output of the electrical heating element 56 or by simultaneously controlling both the rate of revolution and the output of the electrical heating element, the degree of insulation produced by the build-up of char is also controlled. This in turn leads to a controlled or improved rate of production of smoke because more effective application of heating to freshly exposed, relatively uncharred hard-wood is essentially continuously present.

Figure 6:
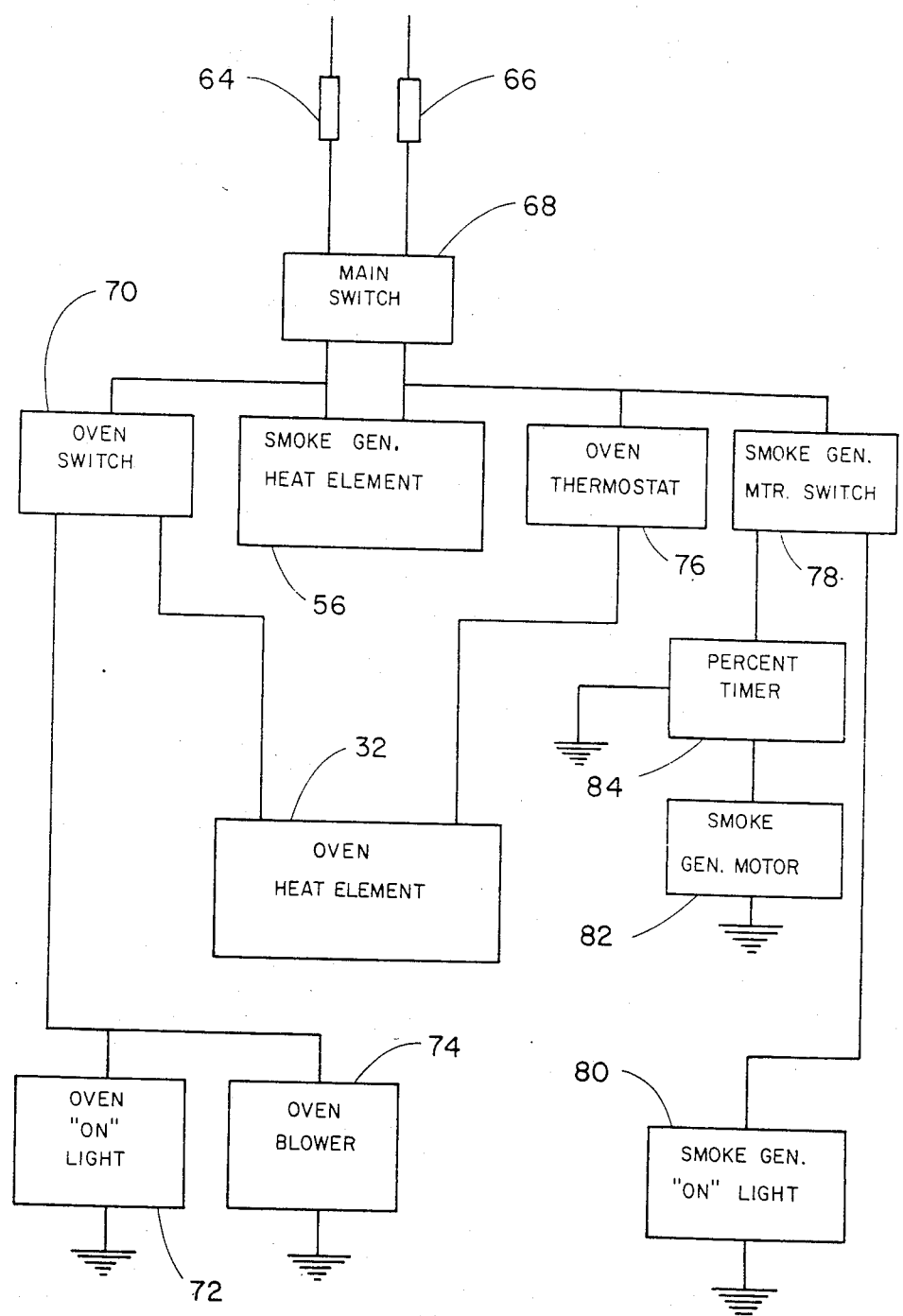
FIG. 6 is a typical block diagram of the electrical controls for the convection oven with smoke generator of FIG. 1.

As further illustrated in FIG. 3, the external, rear portion of the oven chamber 12 and smoke generating chamber 18 are equipped with the external electric motors 74 and 82 which serve to drive the air circulating fan 30 and rotating cylinder 48 with scraping blade 50, respectively. The convection oven is also equipped with an oven heating element connector housing 62, a main control panel box or panel 28 and appropriate shielded connections. FIG. 6 illustrates a typical wiring schematic of the variable rate of revolution embodiment in a block diagram format corresponding to the main control functions for control panel 28 (see FIG. 2) and associated circuits.

As illustrated in this specific embodiment, the electrical input involves a pair of fused 64 and 66 inlet lines leading to a double pole, single throw (dpst) main power switch 68. The output of the main switch 68 powers the heating element 56 of the smoke generator such that the block of hard-wood 42 begins to be heated upon turning on the main power switch. One side of the main switch output also leads through oven switch 70 to one side of the 220 volt oven heating element 32. The oven switch 70 is also a dpst switch which powers the oven "on/off" light 72 and oven blower motor 74 (see FIG. 3) which in turn drives fan 30 within the oven. The other side of the main switch 68 is connected to the other terminal of the 220 volt heating element 32 after passing through oven thermostat controller 76 (see FIG. 2). This side of the main switch 68 is also connected to dpst smoke generator motor switch 78 which powers the smoke generator "on/off" light 80 and the smoke generator motor 82 via the percent timer controller 84. In this manner, the duty cycle for turning of the heated cylinder and scraping blade 50 (i.e., the rpm's of the smoke generator motor) is controlled by the setting of the percent time controller 84 (again, see FIG. 2). In the embodiment wherein the electrical heating element if controlled, additional circuitry to vary the heat energy output of the smoke generator heat element 56 is provided. This additional circuitry could be, for example, an additional percent timer circuit similar to the smoke generator motor circuitry 82 and 84 in FIG. 6. Preferably, the heating element output is to be controlled by the presence of a variable voltage transformer (not shown) or the like in series with the leads to the smoke generator heat element 56.

In order to demonstrate the advantages of the convection oven and smoke generator according to the present invention, a convection oven with smoke generator essentially as described and as illustrated in the figures, having a nominal capacity of approximately fifty pounds of beef, was manufactured using predominantly stainless steel construction with insulated sidewalls. A 220 volt, 2500 watt CALROD circular heating element was employed in the oven while a 220 volt, 150 watt WATLOW heating element was employed in the smoke generator. The following Table summarizes the commercially available electronic components employed in this prototype unit.

TABLE

| | |
|---|---|
| Convection Fan and Motor | EBM No. R2S150AT-29 |
| Oven Heating Element | WATLOW No. RBN 8025 |
| Smoke Generator Heating Element | WATLOW Firerod No. G2A37 |
| Gear Motor | Dayton No. 3M104 |
| Oven Thermostat | United Electric Controls Co. Series 62 No. G22BC |
| Main Switch (and all others) | Dayton No. 2x467 |
| Percentage Timer | Dayton No. 1A368 |
| Lights | Radio Shack No. 272-710 & 711 |

Blocks of dried hickory wood were cut to fit the smoke generator wood channel and approximately a five pound weight was used to force the hickory block downward against the revolving cylinder with scraping blade. The duty cycle on the percent timer was adjusted to about 12% which resulted in about one revolution per minute at the scraping blade. The convection oven was operated primarly between 220° to 240° F. on up to as high as 300° F. Various types of meat were employed in the oven during the test runs. Using a nominal value of one hour of cooking per pound of meat being smoked as being characteristic of the conventional vented smoke pit, the rate of smoking meat in the convection oven/smoker generator system of the present invention compared favorably to the conventional vented smoke pit. At 220° to 240° F., the time required to adequately smoke meat was reduced to about 66% to 75% of the time required when using a conventional prior art smoker. At 300° F., the convection oven/smoker of the present invention was 50% faster than the normal pit. At the higher oven temperatures, a heretofore unknown observation was made relative to the operation of smokers. Upon opening of the oven door, no significant heavy smoke was initially observed within the oven chamber, yet the smoke generator was known to be smoldering and consuming the hickory wood at a nominal temperature of 1000° F. Within moments of opening the 300° F. oven, a large cloud of dense smoke started to form in the room containing the oven/smoker. Also, significant water vapor was observed to form in the oven (suggesting the advantageous use of a water trap and drain, not shown). Apparently, the high humidity and combustion products produced in the smoke generation at the high operating temperatures are not visibly perceptible as customarily observed in vented smoke pit operations. Although the above observation may not be fully understood and as such, the present invention is not to be unduly limited to a single technical explanation, it is felt to be significant and related to the observed improved rate of smoking meat. It is presently felt that the apparent single gas phase containing significant water vapor and wood combustion products at high temperatures and essentially ambient pressure continuously recycled within the convection oven is directly responsible for the improved rate of smoking meat.

To further demonstrate the variable control of the smoke generator heating element (WATLOW Firerod No. 62A37) of the previous embodiment, a commercially available variable transformer was placed in series with the electrical leads to the smoke generator heating element. The commercially available transformer employed was a Superior Powerstat, Model 21, with input rating of 50-60 hertz, single phase and 5 amp with output rating of zero to 120 volts. During this demonstration, the revolutions of the charring and scraping cylinder was fixed at a constant nominal speed of 1 revolution per minute. The temperature of the surface making contact with the block of hard-wood was then controlled (varied) by adjusting the setting of the powerstat. Again, the convection oven and smoker was observed to function in a manner as described in the previous embodiment wherein variable control of the rpm's of the scraper was utilized rather than variable temperature of heated surface.

In view of the above observation and particularly the improved rate of cooking/smoking meats, it is felt that the control of the amount of charred residue on the smoldering end of the block of hard-wood leads to a significant distinction between the convection oven/smoker generator of the present invention and the prior known devices. It appears that the amount and the rate of smoke generated is determined and controlled, in part, by controlling the amount of char present on the smoldering wood. The critical feature of the present invention is felt to be related to the degree of thermal insulation present at the surface of the hard-wood being heated. In other words, Applicant has verified that the natural process of charring wood by application of controlled heating, builds up an insulating layer of ash and char which in turn reduces the efficiency of the heating process; hence, reduces the amount of rate of production of smoke being generated. Further, Applicant has discovered that wiping the char off of the smoldering wood leads to significant improvement in the production and control of production of smoke.

Thus, it should be appreciated that the volume of smoke being generated in the smoke generator of the present invention is controlled by several factors; including by way of example, but not limited thereto, the surface temperature of the cylinder in contact with the wood, the dimension and effect of the scraping tool, including the contact angle of the wood to the scraping tool, the pressure or force applied between the heating surface and/or scraping tool and the smoldering block of wood, the rate of revolution of the heating surface and scraping tool and the like. In particular, adjustable variable rpm of the scraping tool on the smoldering block of wood is advantageously employed. This adjustable variable rate of revolution of the cutting tool can usually be varied from an average of about one revolution per ten minutes up to about six revolutions per minute, while the absolute rate of revolving the cutting blade on the charred wood surface can be at an even higher rate. In other words, the revolving motion of the cutting blade can be pulsed periodically at a relatively high rpm yet the average rate of revolution is still about, for example, one revolution per minute.

It should be further appreciated that many other variations in structure, choice of elements, methods of operation and scraping of the charred wood can be substituted for the above described specific embodiment without departing from the scope of the present invention. Thus, various other techniques can be employed to physically remove excess char during smoke generation (such as the use of a rotating heated disc with attached scraping edge, rotating the block of wood on a static heated surface with scraping blade and the like) and as such, these techniques should be equivalent for purposes of this invention.

The advantages and benefits of the convection oven/smoke generator according to the present invention are considered numerous and significant. The overall convection oven/smoke generator according to the present invention is a compact, essentially unvented smoker that operates on low wattage (low power consumption), yet smokes meat and the like at a faster rate than conventional ovens of the prior art. As such, the invention is amenable to a totally portable unit which can be mounted on a stand, on a kitchen counter or the like. It is highly versatile in that it is totally adjustable as to cooking time and smoke density. It is relatively maintenance free requiring only a nominal warm-up time. Since it is an essentially sealed oven, very little smoke is liberated, except when opening the oven door. As such, the unit is amendable to proper air management within the kitchen and commerical establishments. Also, the unit uses blocks of hard-wood directly, thus allowing the elimination of expensive chipping or grinding to sawdust operations associated with other compact smokers.

More specifically, the overall advantages and benefits of the smoker/convection oven according to the present invention is viewed as being the result of and an attribute of a combination of features including the convection oven principle, high humidity or more specifically, high water vapor heating, controlled smoke generation and recycle of a single gas phase in a sealed unit. Thus, according to the present invention, the cooking speed and smoke permeation are enhanced by smoke laden hot moist air continuously being circulated within the oven; thereby, largely eliminating the "dead air" immediately surrounding the meat to be cooked (and smoked) that acts as a deterent in a conventional smoker. The decreased cooking time is a function of both the convection oven principle and the presence of a high humidity and/or high water vapor content being released in an essentially unvented cooking compartment from both the meat being cooked and the smoke being generated. Furthermore, the variable control of the smoke generation and the inherent efficiency of the smoke generation when employed in a non-vented convection oven results in the introduction of a relatively small volume of smoke (as compared to conventional smokers) which is then constantly recirculated and consumed eventually in permeation of the meat or by deposition on the internal walls of the oven. Consequently, the wood consumption of an oven according to the present invention is significantly reduced relative to a conventional smoker and specifically in the case of an oven/smoker exemplified above, the wood consumption does not exceed about 2 ounces per hour.

Having thus described the invention with a certain degree of particularity, it is manifest that many changes can be made in the details of the invention without departing from the spirit and scope of the invention. Therefore, it is to be understood that the invention is not limited to the embodiments set forth herein for purposes of exemplification, but is to be limited only by the scope of the attached claims, including a full range of equivalents to which each element thereof is entitled.

I claim:

1. An improved convection oven/smoker comprising:
   (a) an insulated oven compartment having at least one oven door thereto;
   (b) an insulated smoker generator compartment adapted to supply smoke to said insulated oven compartment; and
   (c) a smoke generator within said insulated smoke generator compartment comprising,
      (i) a channel means operatively adapted to accept and hold a block of wood to be heated for generation of smoke and further adapted to move at least one face of the block of wood towards a heated surface during production of smoke, and
      (ii) a heated surface containing a scraping means that is operatively adapted to make contact with at least one face of a block of wood held in said channel means and further adapted to periodically scrape excess char off the face of the block of wood making contact and being heated by said heated surface during production of smoke, thus controlling the deleterious build-up of insulating char on the face of the block of wood during the production of smoke and resulting in improved control of smoke production.

2. An improved convection oven/smoker of claim 1 wherein said heated surface containing a scraping means is a revolving cylinder with scraping blade.

3. An improved convection oven/smoker of claim 2 wherein said revolving cylinder revolves at an adjustable variable rpm from about one revolution per ten minutes to about six revolutions per minute and said face of the block of wood is held against said revolving cylinder under a force of about two pounds per square inch.

4. An improved convection oven/smoker of claim 2 wherein said insulated oven compartment further comprises an internal circulating fan means for recirculating of smoke within said oven compartment.

5. An improved convection oven/smoker of claim 3 wherein said insulated oven compartment further comprises an internal circulating fan means for recirculating of smoke within said oven compartment.

6. An improved convection oven/smoker of claim 1 wherein the temperature of said heated surface containing a scraping means is adjustable.

7. An improved convection oven/smoker of claim 2 wherein the temperature of said revolving cylinder with scraping blade is adjustable.

8. An improved convection oven/smoker of claim 3 wherein the temperature of said revolving cylinder with scraping blade is adjustable.

9. An improved smoke generator comprising:
   (a) a channel means operatively adapted to accept and hold a block of wood to be heated for generation of smoke and further adapted to move at least one face of the block of wood towards a heated surface during production of smoke, and
   (b) a heated surface containing a scraping means that is operatively adapted to make contact with at least one face of a block of wood held in said channel means and further adapted to periodically scrape excess char off the face of the block of wood making contact and being heated by said heated surface during production of smoke, thus controlling the deleterious build-up of insulating char on the face of the block of wood during the production of smoke and resulting in improved control of smoke production.

10. An improved smoke generator of claim 9 wherein said heated surface containing a scraping means is a revolving cylinder with scraping blade.

11. An improved smoke generator of claim 10 wherein said revolving cylinder revolves at an adjustable variable rpm from about one revolution per ten minutes to about six revolutions per minute and said face of the block of wood is held against said revolving cylinder under a force of about two pounds per square inch.

12. An improved convection oven/smoker of claim 4 wherein the temperature of said heated surface containing a scraping means is adjustable.

13. An improved convection oven/smoker of claim 10 wherein the temperature of said revolving cylinder with scraping blade is adjustable.

14. An improved convection oven/smoker of claim 11 wherein the temperature of said revolving cylinder with scraping blade is adjustable.

15. An improved method of generating smoke comprising the steps of:
 (a) holding at least one face of a block of wood against an electrically heated metal surface having a scraping blade attached thereto at sufficient temperatures that the block of wood smolders and produces smoke with associated char build-up at the face of the block of wood; and
 (b) periodically passing said scraping blade across the char build-up, thus removing excess char from the face of the block of wood during the production of smoke, resulting in improved control of smoke generation.

* * * * *